(12) United States Patent
Isakiewitsch et al.

(10) Patent No.: US 11,970,211 B2
(45) Date of Patent: Apr. 30, 2024

(54) DEFORMATION DEVICE FOR A MOTOR VEHICLE, AND MOTOR VEHICLE COMPRISING A DEFORMATION DEVICE

(71) Applicant: Audi AG, Ingolstadt (DE)

(72) Inventors: Christian Isakiewitsch, Ingolstadt (DE); Nanne Swierstra, Kösching (DE); Florian Grosshauser, Pörnbach (DE); Sebastian Scheiblecker, Train (DE); Mickael Donnard, Offenau (DE); Sean O'Brien, Munich (DE); Thorsten Adolph, Hepberg (DE)

(73) Assignee: AUDI AG, Ingolstadt (DE)

( * ) Notice: Subject to any disclaimer, the term of this patent is extended or adjusted under 35 U.S.C. 154(b) by 344 days.

(21) Appl. No.: 17/440,595

(22) PCT Filed: Mar. 13, 2020

(86) PCT No.: PCT/EP2020/056968
§ 371 (c)(1),
(2) Date: Sep. 17, 2021

(87) PCT Pub. No.: WO2020/200708
PCT Pub. Date: Oct. 8, 2020

(65) Prior Publication Data
US 2022/0194472 A1 Jun. 23, 2022

(30) Foreign Application Priority Data
Apr. 4, 2019 (DE) .................... 10 2019 204 789.0

(51) Int. Cl.
*B62D 21/15* (2006.01)
*B62D 27/02* (2006.01)
(Continued)

(52) U.S. Cl.
CPC ............. *B62D 21/15* (2013.01); *B62D 27/02* (2013.01); *B60L 3/0007* (2013.01); *B60L 50/00* (2019.02);
(Continued)

(58) Field of Classification Search
CPC ...... B62D 21/15; B62D 21/152; B62D 27/02; B62D 21/155; B62D 21/11; B62D 25/08;
(Continued)

(56) References Cited

U.S. PATENT DOCUMENTS 9,120,506 B2   9/2015  Isakiewitsch et al.
9,802,498 B2  10/2017  Isakiewitsch
(Continued)

FOREIGN PATENT DOCUMENTS

DE   102014206739 A1  10/2015
DE   102014018753 A1   6/2016
(Continued)

OTHER PUBLICATIONS

International Preliminary Report on Patentability directed to related International Patent Application No. PCT/EP2020/056968, dated Sep. 28, 2021, with attached English-language translation; 13 pages.
(Continued)

*Primary Examiner* — Amy R Weisberg
*Assistant Examiner* — Dana D Ivey
(74) *Attorney, Agent, or Firm* — Sterne, Kessler, Goldstein & Fox P.L.L.C.

(57) ABSTRACT

The present disclosure relates to a deformation device for a motor vehicle. The deformation device comprises a support structure and a charging module which is fixed to the support structure at two mutually spaced connecting elements. The support structure comprises a target bend region which is arranged between the at least two connecting elements. The support structure is designed to bend, at least in regions, at
(Continued)

the target bend region in the event of accident-related deformation of said support structure, and as a result press onto the charging module at the target bend region, and release a first connection between the charging module and the support structure formed via a first connecting element of the at least two connecting elements. A further aspect of the present disclosure relates to a motor vehicle having the deformation device.

10 Claims, 6 Drawing Sheets

(51) Int. Cl.
*B60L 3/00* (2019.01)
*B60L 50/00* (2019.01)
*B60L 53/20* (2019.01)
*B60L 53/22* (2019.01)
*B62D 21/11* (2006.01)
*B62D 25/08* (2006.01)

(52) U.S. Cl.
CPC ............... *B60L 53/20* (2019.02); *B60L 53/22* (2019.02); *B62D 21/11* (2013.01); *B62D 21/152* (2013.01); *B62D 21/155* (2013.01); *B62D 25/08* (2013.01); *Y02T 10/70* (2013.01); *Y02T 10/7072* (2013.01)

(58) Field of Classification Search
CPC .... Y02T 10/70; Y02T 10/7072; B60L 3/0007; B60L 50/00; B60L 53/22; B60L 53/20
USPC .................................................. 296/187.03
See application file for complete search history.

(56) References Cited

U.S. PATENT DOCUMENTS 10,870,354 B2   12/2020   Asai
10,875,413 B2   12/2020   Birkholz et al.

FOREIGN PATENT DOCUMENTS

| DE | 102017007401 A1 * | 2/2019 | ........... B62D 21/155 |
|---|---|---|---|
| DE | 102017007401 A1 | 2/2019 | |
| EP | 2738069 A2 | 6/2014 | |
| EP | 3166840 B1 | 9/2018 | |
| EP | 3398837 A1 | 11/2018 | |
| EP | 3398837 B1 * | 3/2020 | ............... B60K 1/04 |
| WO | WO 2018/138908 A1 | 8/2018 | |

OTHER PUBLICATIONS

International Search Report and Written Opinion of the International Searching Authority directed to related International Patent Application No. PCT/EP2020/056968, dated Jun. 25, 2020, with attached English-language translation; 15 pages.

* cited by examiner

DEFORMATION DEVICE FOR A MOTOR VEHICLE, AND MOTOR VEHICLE COMPRISING A DEFORMATION DEVICE

TECHNICAL FIELD

The present invention relates to a deformation device for a motor vehicle, in which the deformation device comprises at least one support structure and at least one charging module which is fixed to the at least one support structure at at least two mutually spaced connecting elements. A further aspect of the present invention relates to a motor vehicle having the deformation device.

BACKGROUND

In order to charge in-vehicle energy stores, for example traction batteries, charging modules are used, which can be arranged, for example, on a vehicle underbody. Since such charging modules are expensive components, their damage should be avoided even in special load cases. Special load cases of this kind include, for example, a frontal, central pole impact, in which there is a central collision between the motor vehicle and a pole-shaped object.

A front or rear vehicle segment of a motor vehicle which has a subframe having two longitudinal members which are spaced apart from one another in the transverse direction of the vehicle and a cross member via which the two longitudinal members are interconnected is known from EP 2 738 069 A2. The subframe has a reinforcing structure to increase the torsional rigidity. A charging module for contactless energy transfer is integrated into the reinforcing structure.

DE 10 2014 206 739 A1 describes a thrust panel for a front vehicle segment of a vehicle body of a vehicle. The thrust panel, which is made of metal, has a receiving region having attaching means for mechanically attaching a secondary coil of an inductive energy transfer system for charging an electrical energy store of the vehicle.

SUMMARY OF INVENTION

The object of the present invention is that of providing a deformation device and a motor vehicle of the type mentioned at the outset, by means of which a charging module can be protected in a particularly favorable manner.

This object is achieved by a deformation device and by a motor vehicle having the features of the independent claims. Advantageous embodiments with expedient and non-trivial further developments of the invention are set forth in the dependent claims.

A first aspect of the invention relates to a deformation device for a motor vehicle, which device comprises at least one support structure and at least one charging module which is fixed to the at least one support structure at at least two mutually spaced connecting elements. The charging module can be designed as a secondary coil, for example. Energy for charging an electrical energy store, for example a traction battery, of the motor vehicle can be transferred contactlessly via this secondary coil by means of an inductive charging process. In the inductive charging process, the energy can be transferred contactlessly from a primary coil, which is outside the vehicle, to the secondary coil. The deformation device can comprise the at least two mutually spaced connecting elements. The at least one support structure can preferably be designed as a frame structure, in particular as a subframe, which can also be referred to as an axle support. For example, the support structure can be designed as a front axle support for the motor vehicle.

According to the invention, the at least one support structure comprises at least one target bend region which is arranged between the at least two mutually spaced connecting elements, and the at least one support structure is designed to bend, at least in regions, at the at least one target bend region in the event of an accident-related deformation of said support structure, and as a result press onto the at least one charging module at the at least one target bend region, and release at least a first connection between the at least one charging module and the at least one support structure formed via a first connecting element of the at least two connecting elements. In other words, in the event of an accident-related deformation, the target bend region can press onto the charging module as a result of the bend and as a result release the first connection. The first connection formed by the first connecting element between the charging module and the support structure can thus be released by pressing the target bend region as a result of the bending onto the charging module. This is advantageous since by releasing at least the first connection, at least some regions of the charging module can be decoupled from the support structure in the event of an accident-related deformation of the support structure, as a result of which accident-related load on the charging module due to the deformation of the support structure can be kept low. By releasing at least the first connection, the charging module can in particular be protected from accident-related deformation. Since at least the first connection is released by pressing the target bend region onto the charging module, it can be ensured in a particularly simple manner that this release only takes place if there is an accident-related deformation of the target bend region, such that, for example, in the case of minor accidents, for example in the event of a slight frontal impact, without such severe deformation of the support structure at its target bend region, the first connection will accordingly not be released.

At the target bend region, the at least one support structure can preferably already have at least one bend in its accident-free state. This allows particularly defined, controlled bending to take place. The at least one bend can have a tip which, when the deformation device is installed on the motor vehicle, for example in the vertical direction of the motor vehicle, can have a smaller distance from the charging module than regions of the support structure directly adjacent to the target bend region. In this way, in the event of the accident-related deformation, contact between the support structure at its target bend region and the charging module can be established particularly quickly and the first connection can accordingly be released quickly in the event of an accident.

The at least two connecting elements can preferably be arranged on opposite end regions of the at least one charging module. This enables greater design freedom in the design or arrangement of the target bend region.

In the context of the present invention, the expression "bend" can in particular be understood to mean "buckling" the support structure. When bending, plastic, accident-related deformation of the support structure can occur in particular.

Releasing can preferably take place by breaking, in particular breaking off, the first connecting element. The advantage of this is that as a result, the first connection can be released particularly quickly in the event of an accident.

The deformation device can preferably be designed in such a way that the charging module continues to be fixed to the support structure by means of at least one of the connecting elements after the accident-related deformation has occurred. In other words, the deformation device can be designed so that the charging module remains fixed to the support structure by means of at least one of the attaching elements despite the accident-related deformation. As a result, the charging module can remain securely fixed on the support structure even after the accident-related deformation.

In an advantageous development according to an embodiment of the invention, the at least one target bend region is arranged at a smaller distance from the at least one first connection than from at least a second connection between the at least one charging module and the at least one support structure formed via a second connecting element of the at least two connecting elements. This is advantageous because the smaller distance from the first connection means that a compressive load as well as a bending load on the charging module can be kept particularly low when the target bend region of the support structure is pressed onto the charging module as a result of an accident.

In a further advantageous development according to an embodiment of the invention, the at least two connecting elements have different strength parameters, in particular tensile strengths. This is advantageous because it allows at least the first connection to be released in a particularly controlled manner and in a predetermined manner. Releasing can take place in a particularly targeted manner if the at least two connecting elements have different tensile strengths.

In a further advantageous development according to an embodiment of the invention, the at least two connecting elements have different load cross sections, in particular stress cross sections. This is advantageous because at least the first connection can be released in a particularly defined and controlled manner on the basis of the different load cross sections or stress cross sections due to different dimensions of the at least two connecting elements.

In a further advantageous development according to an embodiment of the invention, at least one of the at least two connecting elements is designed as a screw element. This is advantageous because it allows the charging module to be separated from the support structure with little effort, for example in the course of maintenance work. The screw element can be designed, for example, as a screw, a threaded rod or a threaded bolt, to name just a few examples. In principle, it is also conceivable, for example, for the screw element to be designed as a screw nut.

In a further advantageous development according to an embodiment of the invention, the at least one first connection is formed via a housing element of the at least one charging module. This is advantageous because, as a result of the pressing of the target bend region, in order to release the charging module, for example, a controlled breaking or tearing of the corresponding connecting element in its direct coupling with the housing element can take place. The housing element can, for example, have a projection or flange on which the first connecting element can engage. The housing element can, for example, have a through opening through which the first connecting element can be guided and as a result can be in engagement with the housing element.

In a further advantageous development according to an embodiment of the invention, the at least one first connection has at least one target break point. This is advantageous because it allows the charging module to be released from the support structure in a particularly reliable and controlled manner by means of controlled breaking or tearing off of the target break point. For example, at least one of the at least two connecting elements can be provided with the target break point. In addition, the at least one target break point can also be provided, for example, on a housing of the charging module, as a result of which the housing advantageously not only serves to protect each of the electrical components of the charging module from environmental influences, but also helps to minimize damage to the charging module in the event of an accident-related deformation of the support structure. Accordingly, the housing then has an increased functionality.

A second aspect according to an embodiment of the invention relates to a motor vehicle having a deformation device according to the first aspect of the invention. An embodiment of the invention also includes developments of the motor vehicle according to the second aspect which have features such as those previously described in connection with the developments of the deformation device according to a first aspect of the invention. For this reason, the corresponding further embodiments of the motor vehicle are not described again here.

The motor vehicle according to an embodiment of the invention can preferably be designed as a car, in particular as a passenger car or truck or as a passenger bus. In principle, it is even possible to design the motor vehicle as a motorcycle.

In an advantageous development according to an embodiment of the invention, the at least one target bend region is arranged above the at least one charging module in the vertical direction of the motor vehicle. This is advantageous, since this helps the charging module to be spaced apart from the support structure at least in regions after at least the first connection has been released by gravity.

In a further advantageous development according to an embodiment of the invention, the at least two connecting elements are spaced apart from one another in the direction of the longitudinal extent of the motor vehicle. This is advantageous because it enables a particularly linear transmission of accident-related forces in the event of a frontal impact between the at least two connecting elements, as a result of which a favorable flow of force with little force deflection can contribute to releasing the first connection.

An another embodiments of the invention also comprises the combinations of the features of the described embodiments.

BRIEF DESCRIPTION OF THE FIGURES

Embodiments of the invention are described below by way of example. In the drawings.

DETAILED DESCRIPTION

Figure 1:
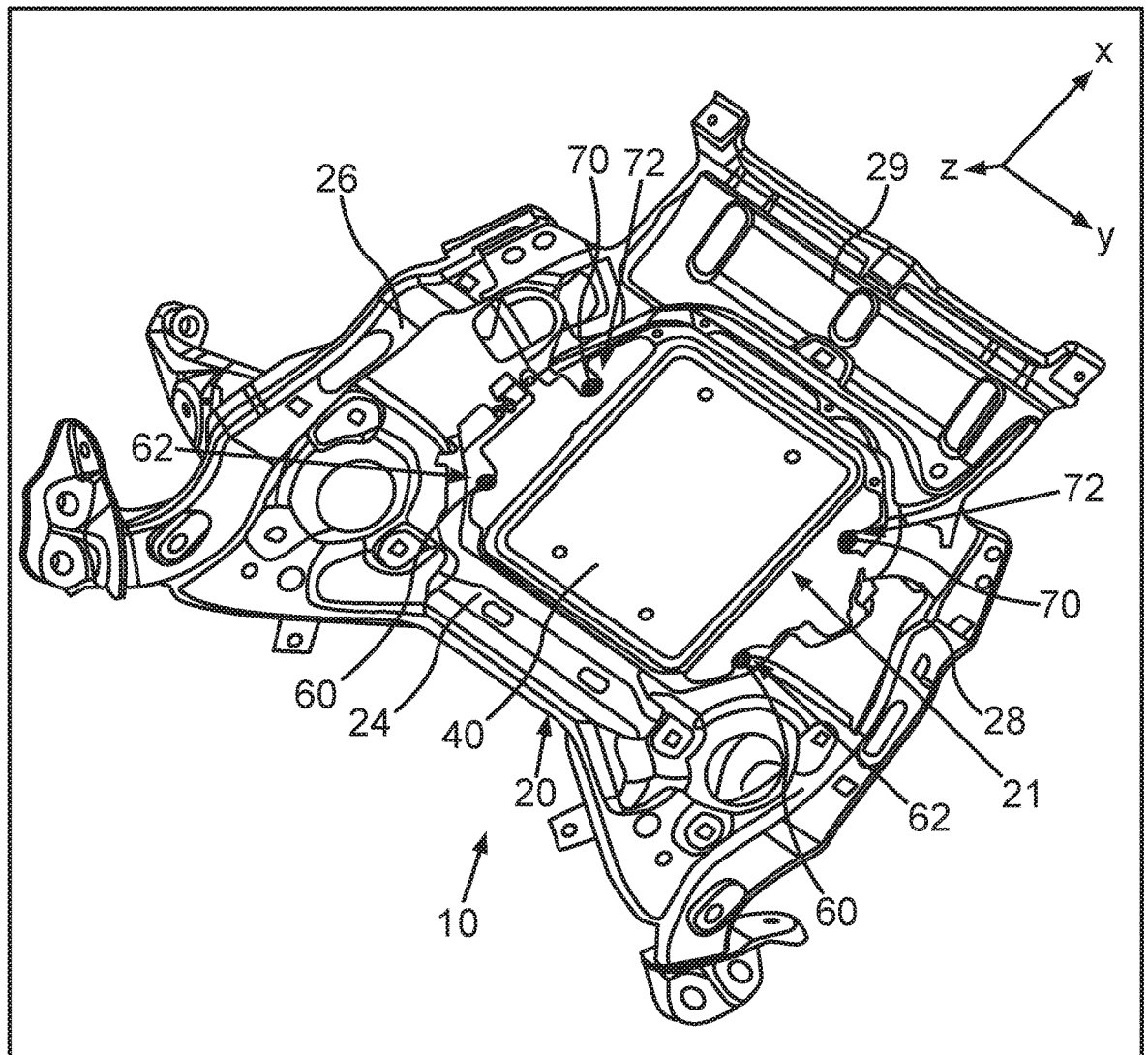
FIG. 1 shows a schematic perspective view of an underside of a deformation device which comprises a support structure, a plurality of connecting elements and a charging module which is fixed to the support structure via the connecting elements, and a highly abstract representation of a motor vehicle, on the underbody of which the deformation device is arranged.

The embodiments explained below are preferred embodiments of the invention. In the embodiments, the described components of the embodiments each represent individual features of the invention which are to be considered to be independent of one another and which each further develop the invention independently of one another. Therefore, the disclosure shall also comprise other combinations of the features of the embodiments than the ones presented. Furthermore, the described embodiments may also be supplemented by further features of the invention as already described.

In the drawings, the same reference signs refer to functionally identical elements.

Figure 2:
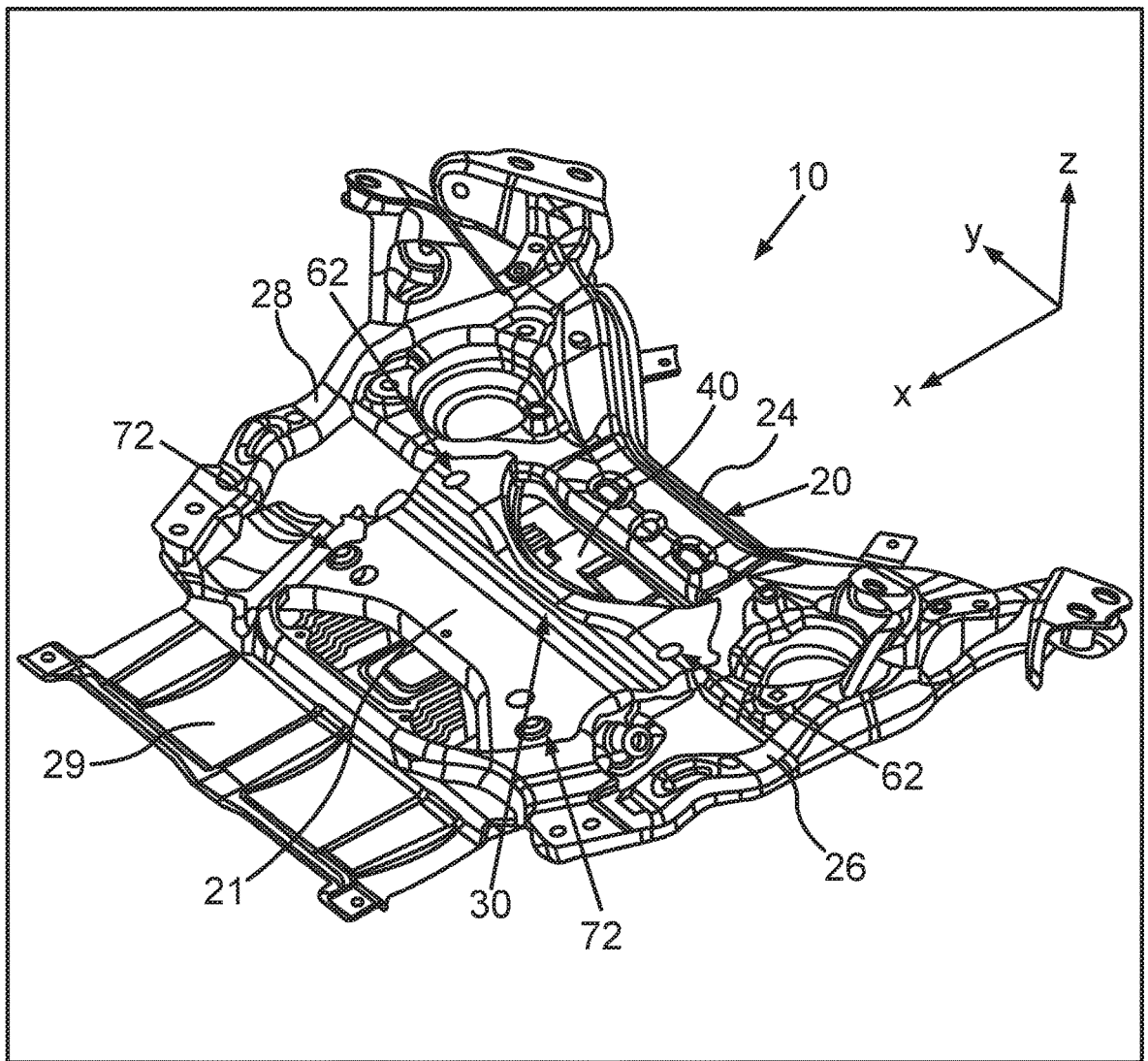
FIG. 2 shows a schematic perspective view of an upper side of the deformation device.
Figure 3:
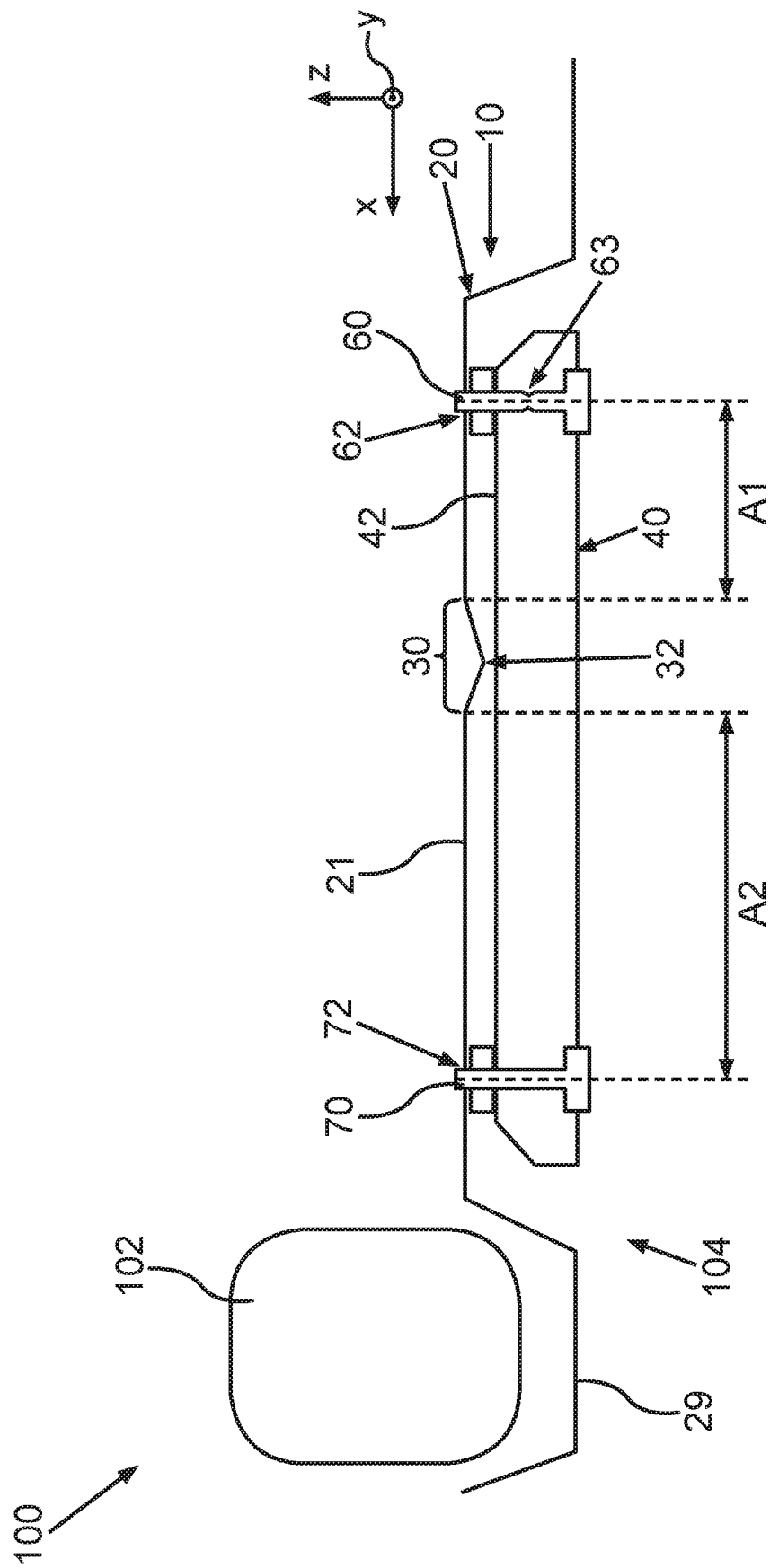
FIG. 3 shows a schematic sectional illustration of a partial region of the motor vehicle and the deformation device arranged on its underbody in the accident-free state.
Figure 4:
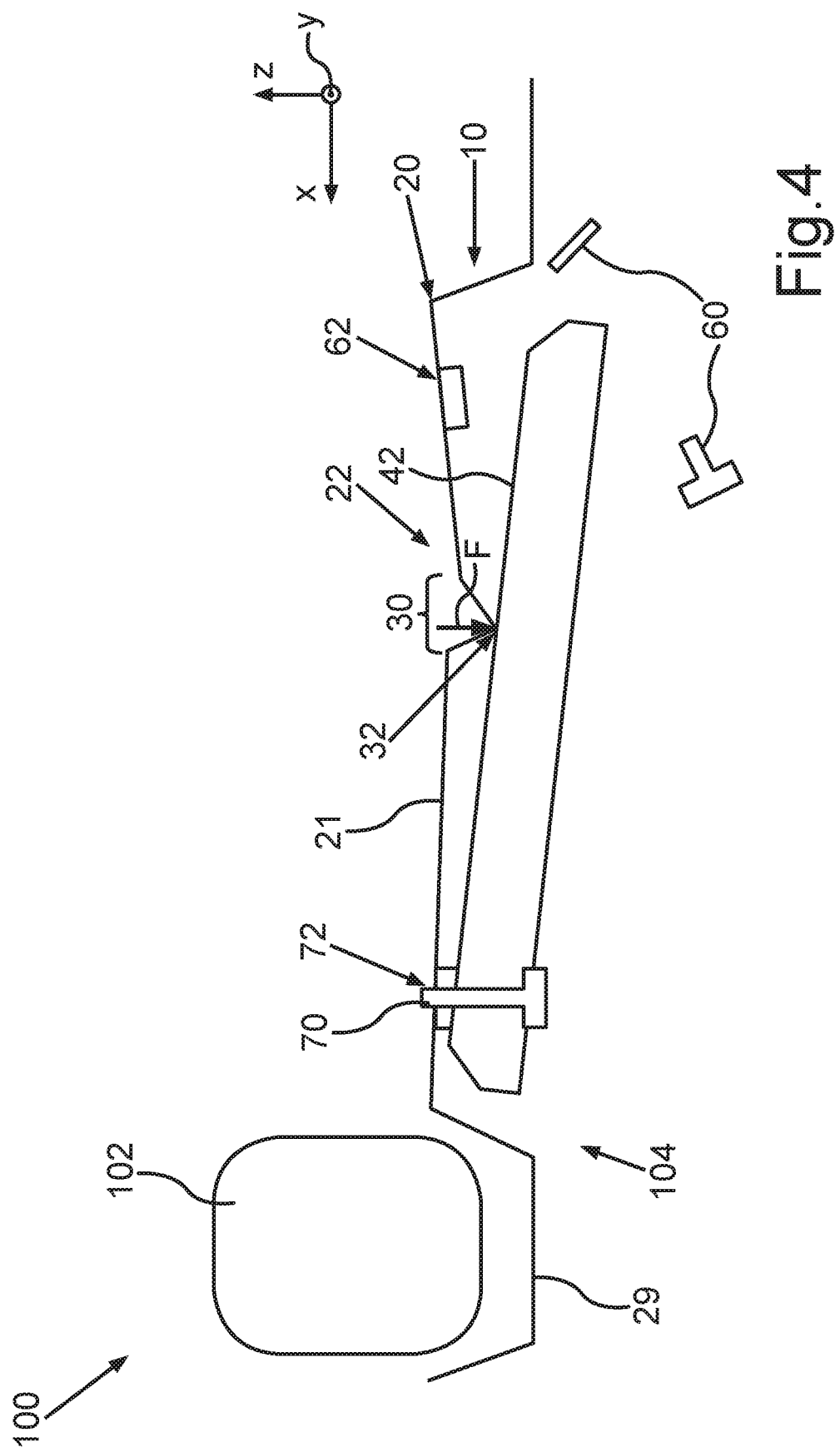
FIG. 4 shows a further schematic sectional illustration of the partial region of the motor vehicle and of the deformation device arranged on its underbody during an accident-related deformation of a support structure of the deformation device.
Figure 5:
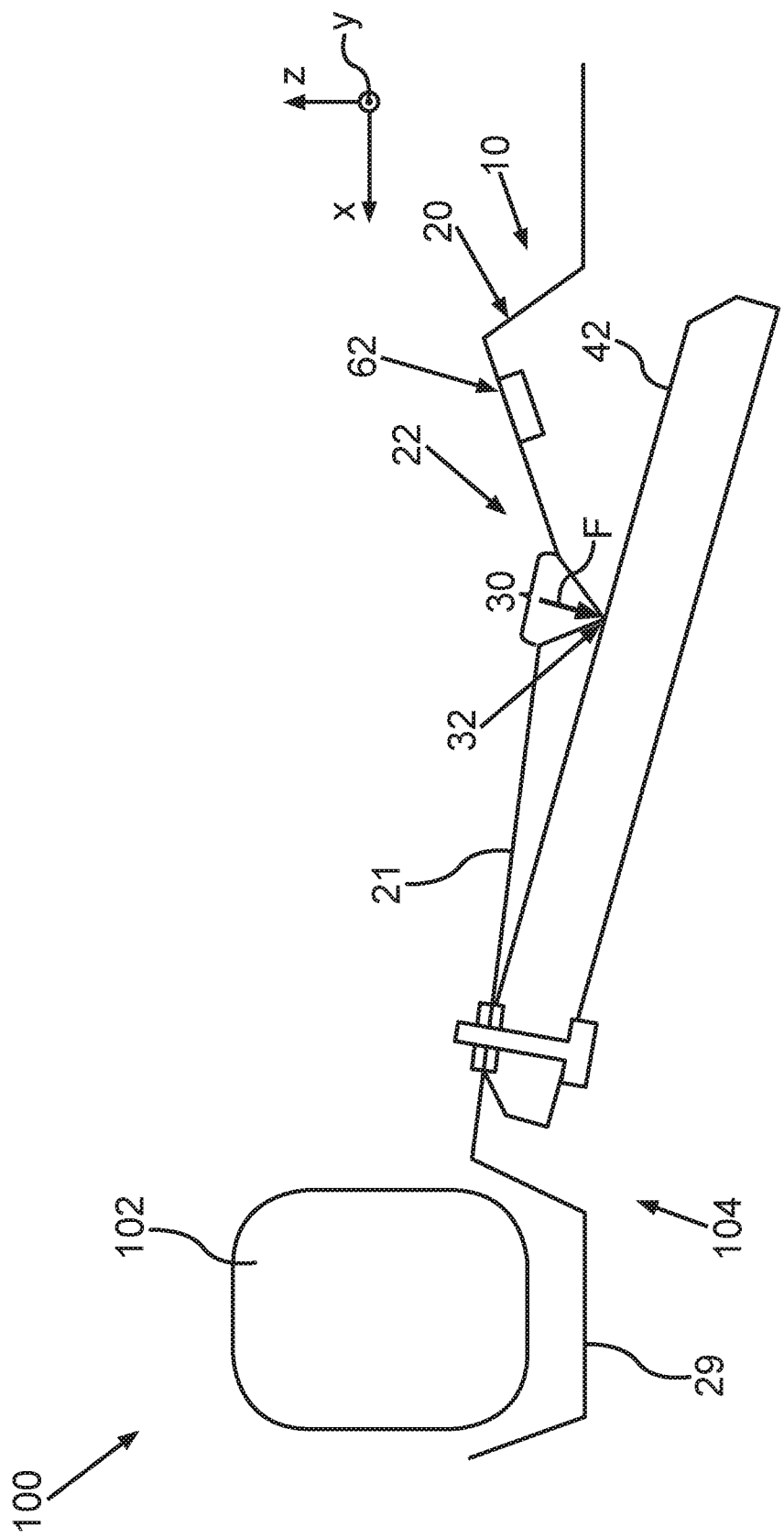
FIG. 5 shows a further schematic sectional illustration of the partial region of the motor vehicle and of the deformation device arranged on its underbody after the accident-related deformation of the support structure.

FIGS. 1 and 2 each show schematic perspective views of a deformation device 10 which is arranged on an underbody 104, indicated in FIGS. 3 to 5, of a motor vehicle 100 which is shown in a highly abstract manner in the present case. FIGS. 3, 4 and 5 each show schematic sectional views of a partial region of the motor vehicle 100 and of the deformation device 10.

FIGS. 1 to 5 each show a coordinate system related to the motor vehicle 100, which is defined by a longitudinal direction x of the vehicle, by a transverse direction y of the vehicle and by a vertical direction z of the vehicle of motor vehicle 100. In the present case, the longitudinal direction x of the vehicle also generally corresponds to a direction of longitudinal extent of the deformation device 10. In the present case, the transverse direction y of the vehicle also generally corresponds to a direction of transverse extent of the deformation device 10. In the present case, the vertical direction z of the vehicle also generally corresponds to a direction of upward extent of the deformation device 10.

The deformation device 10 comprises a support structure 20 as well as a charging module 40 which is fixed to the support structure 20 at a plurality of mutually spaced connecting elements 60, 70 of the deformation device 10. The support structure 20, which can have any design, can generally be designed as a subframe, in particular a front axle support, as can be seen in FIGS. 1 and 2. The support structure 20 comprises two longitudinal supports 26, 28 which are opposite one another in the transverse direction y of the vehicle and extend at least predominantly in the longitudinal direction x of the vehicle, as well as at least one (or more) transverse support(s) 24 which extend(s) at least predominantly in the transverse direction y of the vehicle and is/are at least indirectly connected to the longitudinal supports 26, 28. In addition, the support structure 20 can have a steering guard 29, for example designed as a double-walled sheet metal part, which is used to protect a steering gear 102 of the motor vehicle 100 that is indicated schematically in FIGS. 3 to 5. The steering guard 29 can, as shown in FIGS. 3 to 5, extend below the steering gear 102 in the vertical direction z of the vehicle, so that the steering guard 29 can avoid a collision of this obstacle with the steering gear 102, for example when driving over an obstacle close to the ground.

The support structure 20 can also have a support element 21, which can be designed in a plate-like manner. The support element 21 can be coupled to each of the longitudinal supports 26, 28 in a force-transmitting manner. In the present case, the support element 21 forms a connecting structure which extends between the longitudinal members 26, 28 and is coupled to them. The support element 21 can also be referred to as a base support.

As can be seen in particular in FIG. 1, the deformation device 10 can have, for example, four connecting elements 60, 70, via which the charging module 40 is coupled to the support structure 20, in the present case to the support element 21. Of these four connecting elements 60, 70, two first connecting elements 60 and two second connecting elements 70 are provided in the present case. It can be seen both in FIG. 1 and FIG. 2 that each of the first connection elements 60 form a first connection 62 between the charging module 40 and the support structure 20 in each case, whereas each of the second connection elements 70 form a second connection 72 between the charging module 40 and the support structure 20 in each case. The charging module 40, which can also be referred to as a secondary coil, can generally be positioned between the longitudinal members 26, 28 and fixed to the support element 21 via each of the first connections 62 and second connections 72.

The first connecting elements 60 are spaced apart from one another in the transverse direction y of the vehicle. The second connecting elements 70 are also spaced apart from one another in the transverse direction y of the vehicle. In addition, the two first connecting elements 60 are spaced apart from the two second connecting elements 70 in the direction of longitudinal extent x of the motor vehicle 100.

When the motor vehicle 100 travels in a direction of travel which, in the present case, corresponds to an arrow direction of an arrow illustrating the longitudinal direction x of the vehicle, a frontal, central pole impact can occur, in which a pole-shaped object can impact the motor vehicle 100 against the direction of the arrow between the longitudinal supports 26, 28.

In order to protect the charging module 40 from damage in a particularly favorable and effective manner, the support structure 20 comprises a target bend region 30, which in the present case extends along the support element 21 (connection structure between the longitudinal supports 26, 28). In the present case, the target bend region 30 is arranged above the charging module 40 in the vertical direction z of the motor vehicle 100.

A main direction of extent of the target bend region 30 extends in the transverse direction y of the vehicle. As can be seen in FIG. 2, the target bend region 30 can extend in the transverse direction y of the vehicle over the entire support element 21, as a result of which a defined bend can take place over a particularly large portion.

In the present case, the target bend region 30 is arranged in the longitudinal direction x of the vehicle between each of the mutually spaced connecting elements 60, 70, as can be seen, for example, in FIG. 3. FIG. 3 initially shows the partial region of the motor vehicle 100 in the normal state and thus in an accident-free state.

The support structure 20 is now designed to bend at the target bend region 30 and thus at the support element 21 in the event of its accident-related deformation 22, the course of which is shown purely schematically in detail in FIG. 4 and FIG. 5, and as a result to press the bend region 30 onto the charging module 40. The accident-related deformation 22 results from the frontal, central pole impact, due to which there may be a reaction force oriented along the longitudinal direction x of the vehicle. The reaction force causes the support structure to be compressed, in particular on the support element 21.

As is also shown in FIG. 4 and FIG. 5, a tip 32 of the target bend region 30 protruding downward in the vertical direction z of the vehicle in the direction of the charging module 40 can exert a compressive force F on the charging module 40. The target bend region 30 deforms above the charging module 30 in the vertical direction z of the vehicle and, as a result of the deformation in the vertical direction z of the vehicle, presses downward in the direction of the charging module 40.

As a result of the target bend region 30 being pressed onto the charging module 40, i.e., by exerting the compressive force F, the connections 62, 64 are subjected to tensile charging and this causes each of the first connections 62 to be released, each of the first connection elements 60 being designed, as a result of the pressing, i.e. as a result of the compressive force F (which causes the tensile load), to break off or tear off. By releasing the first connections 62, the charging module 40 can be protected in a particularly favorable manner, at least largely, from accident-related deformation forces that act in particular in parallel with the longitudinal direction x of the vehicle. After the first connections 62 have been released, the support structure 20 (subframe) can be further deformed, i.e. compressed, and thus absorb energy. Since, however, as a result of releasing the first connections 62, the charging module 40 is at least partially outside a deformation region of the support structure 20 or the support element 21, the charging module 40 remains at least largely undamaged.

The charging module 40 can also, after releasing the first connections 62, pivot downward via the second connections 72 relative to the support structure 20 and thus relative to the support element 21 in regions in the longitudinal direction z of the vehicle, as a result of which an accident-related effect of thrust forces on the charging module 40 can be particularly effectively prevented.

FIG. 3 shows an example of a sectional illustration in an x-z plane, in which it can be seen that the target bend region 30 is preferably arranged in the longitudinal direction x of the vehicle at a smaller distance A1 from the first connections 62 than from the second connections 72 between the charging module 40 and the support structure 20. The target bend region 30 has the distance A1 to the first connections 62 in the longitudinal direction x of the vehicle, the distance A1 being smaller than a distance A2 in the longitudinal direction x of the vehicle between the target bend region 30 and the second connections 72. By means of these distances A1, A2, the first connections 62 can be released under a particularly low load, in particular bending load, of the charging module 40.

Each of the connecting elements 60, 70 can preferably have different strength parameters, in particular tensile strengths. The first connection elements 60 can thus have a lower strength value, in particular a lower tensile strength, than the second connection elements 70, as a result of which a particularly reliable and defined release of the first connections 62 can be achieved.

Independently of this, the two connecting elements 60, 70 can preferably have different load cross sections, in particular stress cross sections. The first connection elements 60 can have a smaller load cross section than the second connection elements 70, which also contributes to a particularly reliable and defined release of the first connections 62. If the connecting elements 60, 70 are designed, for example, as screws or other screw elements such as threaded rods, the first connecting elements 60 can preferably have a smaller stress cross section (as load cross sections) than the second connecting elements 70. This also contributes to a particularly reliable and defined release of the first connections 62.

Figure 6:
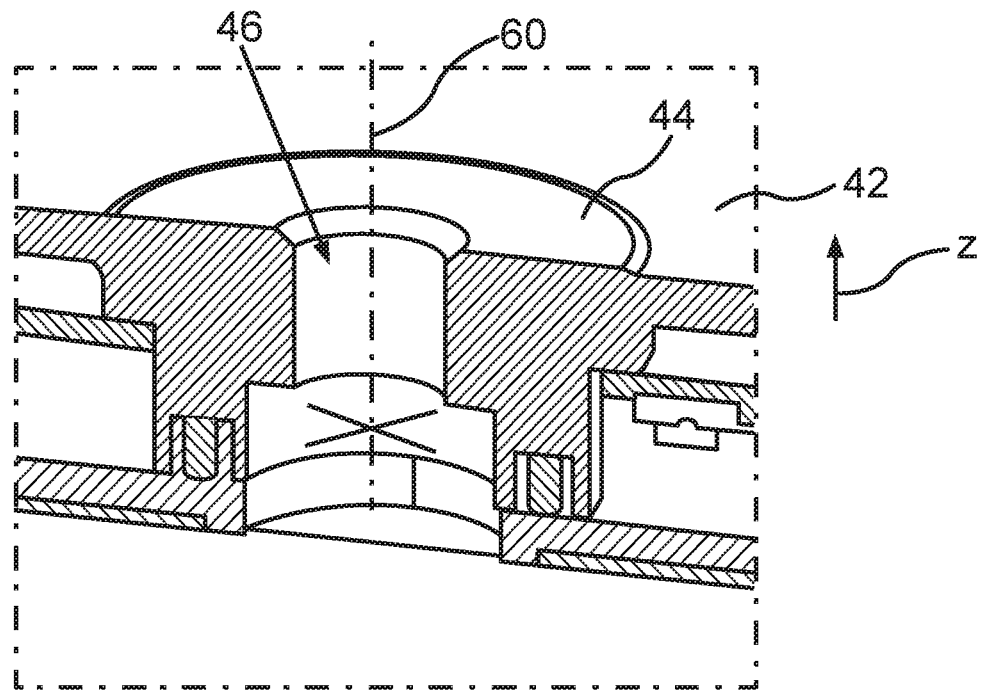
FIG. 6 shows a schematic perspective sectional illustration of a partial region of a housing element of the charging module.
Figure 7:
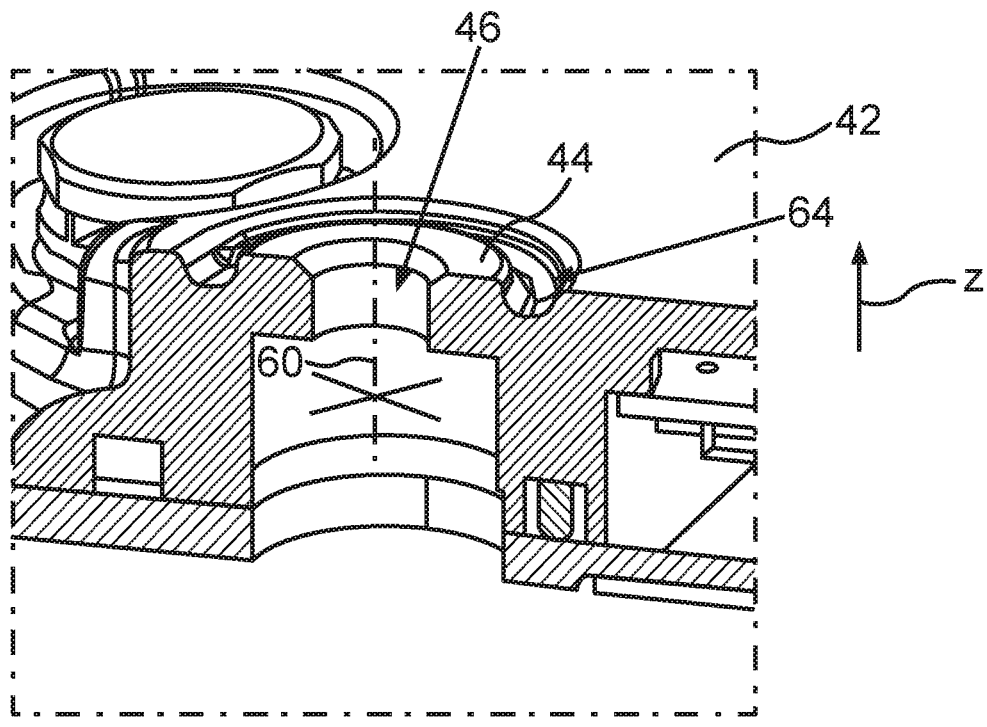
FIG. 7 shows a further schematic perspective sectional illustration of the partial region of the housing element of the charging module, a predetermined break point being provided on the housing element.

FIGS. 6 and 7 each show a section of a housing of the charging module 40, only one housing element 42 of this housing being visible. A flange 44 having a through opening 46 is provided on the housing element 42. As can be seen in FIG. 6, the through opening 46 can have a countersink. The through opening 46 is used to receive the first connecting element 60, which is shown only schematically in FIG. 6. The first connecting element 60 can be guided through the through opening 46 and connected to the support structure 20 (here: to the support element 21). The first connection 62 is then formed via the housing element 42 of the charging module 40. FIG. 7 also shows a section of the housing of the charging module 40, in which it can be seen that the housing element 42 is provided with a target break point 64 in order to facilitate releasing the charging module from the support structure 20 or the support element 21. The target break point 64 formed on the housing element 42 can be formed, for example, as a notch. As indicated in FIG. 7, the notch can extend around the through opening 46 in the circumferential direction. In FIG. 3 it is shown that, in addition or as an alternative to the target break point 64, each of the first connecting elements 60 can also be provided with a target break point 63. The target break point 63 on each of the first connecting elements 60 can be designed, for example, as a circumferential groove. In summary, the first connections 62 can each have at least one target break point 63, 64.

In summary, the present deformation device 10 makes it possible to provide a damage mechanism that protects the expensive charging module 40 (secondary coil) in the event of a frontal collision, such as a frontal, central pole impact. The first connecting elements 60, which are arranged in the longitudinal direction x of the vehicle (direction of travel) behind the second connecting elements 70, can be designed as aluminum screws, for example. Furthermore, the first connecting elements 60 can be provided with a thread with the abbreviation M6. The second connecting elements 70 can be designed as steel screws, for example. Furthermore, the second connecting elements 70 can be provided with a thread with the abbreviation M8. The connecting elements 60, 70 can therefore preferably have different thread diameters and additionally or alternatively be formed from different materials having different material strengths. This can ensure that the tensile strength of the first connecting elements 60 and the second connecting elements 70 are different in each case. It is also possible to provide said predetermined break points 63, 64.

Overall, the examples show how the invention can provide improved crash behavior on a front axle support having an inductive charging module

The invention claimed is:
1. A deformation device for a motor vehicle, comprising:
   a support structure;
   a charging module fixed to the support structure;
   a first connecting element defining a first connection between the support structure and the charging module; and a second connecting element defining a second connection between the support structure and the charging module, wherein the first connecting element is spatially separated from the second connecting element, wherein the support structure comprises a target bend region arranged between the first connecting element and the second connecting element, and the support structure is configured to bend at the target bend region upon deformation of the support structure such that the target bend region presses onto the charging module, thereby releasing the first connection between the charging module and the support structure defined by the first connecting element.

2. The deformation device according to claim 1, wherein the target bend region is spatially separated from the first connection by a first distance, and the target bend region is spatially separated from the second connection by a second distance that is greater than the first distance.

3. The deformation device according to claim 1, wherein the first connecting element has a first tensile strength, and the second connecting element has a second tensile strength that is different than the first tensile strength.

4. The deformation device according to claim 1, wherein the first connecting element has a first stress cross-section, and the second connecting element has a second stress cross-section that is different than the first stress cross-section.

5. The deformation device according to claim 1, wherein at least one of the first and second connecting elements comprises a screw element.

6. The deformation device according to claim 1, wherein the charging module comprises a housing module, and the housing module receives the first connecting element at the first connection.

7. The deformation device according to claim 1, wherein the housing module includes a target break point at the first connection.

8. A motor vehicle comprising:
a deformation device, wherein the deformation device comprises:
a support structure;
a charging module fixed to the support structure;
a first connecting element defining a first connection between the support structure and the charging module; and
a second connecting element defining a second connection between the support structure and the charging module,
wherein the first connecting element is spatially separated from the second connecting element,
wherein the support structure comprises a target bend region arranged between the first connecting element and the second connecting element, and the support structure is configured to bend at the target bend region upon deformation of the support structure such that the target bend region presses onto the charging module, thereby releasing the first connection between the charging module and the support structure defined by the first connecting element.

9. The motor vehicle according to claim 8, wherein the target bend region is arranged above the charging module in a vertical direction of the motor vehicle.

10. The motor vehicle according to claim 8, wherein the first connecting element is spatially separated from the second connecting element in a longitudinal direction of the motor vehicle.

* * * * *